United States Patent [19]

Hosoi et al.

[11] 4,132,112
[45] Jan. 2, 1979

[54] PRESSURE-MEASURING SHEET

[75] Inventors: Noriyuki Hosoi; Yasuhiro Ogata; Hiroharu Matsukawa, all of Fujinomiya, Japan

[73] Assignee: Fuji Photo Film Co., Ltd., Minami-ashigara, Japan

[21] Appl. No.: 824,126

[22] Filed: Aug. 12, 1977

[30] Foreign Application Priority Data

Aug. 12, 1976 [JP] Japan .................................. 51-96678

[51] Int. Cl.$^2$ ............................................... G01L 1/00
[52] U.S. Cl. ................................... 73/141 R; 428/307
[58] Field of Search ............... 73/88 R, 88 A, 141 R; 428/307, 323, 488, 913

[56] References Cited

U.S. PATENT DOCUMENTS

| 3,469,439 | 9/1969 | Roberts et al. | 73/88 R |
| 4,002,060 | 1/1977 | Ogata et al. | 73/88 R |
| 4,055,358 | 10/1977 | Garner et al. | 428/307 X |

Primary Examiner—James J. Gill
Attorney, Agent, or Firm—Sughrue, Rothwell, Mion, Zinn and Macpeak

[57] ABSTRACT

A pressure-measuring sheet comprising a support having thereon a layer of microcapsules containing an electron-donating color former capable of forming a color on contact with an electron-accepting color developer, the microcapsules comprising a mixture of at least two groups of microcapsules having different ratios $\delta/D$ of the number average wall thickness $\delta$ of the microcapsules to the volume average particle diameter D of the microcapsules and having a Ps value difference of about 50 to about 1,000 kg/cm$^2$. Various planar and linear pressures and the distributions thereof can be measured by the pressure-measuring sheet utilizing changes in the densities of colors formed upon the application of pressures to the microcapsule layer because the color density changes are directly related to the pressures applied.

24 Claims, No Drawings

PRESSURE-MEASURING SHEET

BACKGROUND OF THE INVENTION

1. Field of the Invention

This invention relates to a pressure-measuring sheet, and a method for measuring pressures using this sheet. More specifically, the invention relates to a pressure-measuring sheet coated with a mixture of at least two groups of microcapsules having a volume average particle size and a number average wall thickness in a specified relationship.

2. Description of the Prior Art

There has been a need for dynamic methods of measuring various planar and linear pressures such as the clamping pressures of bolts in general machinery, pressures applied to automobile braking devices, mold pressures, tightening pressures, pressures between resins in molds and mold walls, and molding pressures within molds in the molding of thermoplastic or thermosetting resins, the abutting planar pressures of springs, the clamping planar pressures of joint parts in carburetors, fuel pipes, fuel tanks, etc., of a fuel system, collision pressures between a model of the human body and objects in an automobile collision, the linear and planar pressures of rubber and plastic rolls, the checking of the effective limit and the state of effectiveness of gasket seals, the hydraulic pressures of braking devices, the teeth abutting pressures of gears, contact planar pressures between solids, bolt clamping pressures, abutting pressures of cocks in cock valves, abutting pressures between curved surfaces, abutting pressures of steel-rolling rolls during operation, the pressure distribution on the soles of the feet and on the floor surface, and the pressure distribution between the human body and a chair. However, no simple method for measuring such pressures is presently available, and those available involve very complicated procedures.

Conventional methods for measuring pressures such as planar and linear pressures include, for example, methods which use a strain gauge based on the relationship between stress and strain, and methods which use a load meter or a pressure-sensitive paint (strain-sensitive lacquer).

When a strain gauge is used to measure planar and linear pressures, not only is a sophisticated apparatus including an amplifier, a detector, a recorder, etc., needed but also skilled techniques in operating these devices and complicated calculations involving material dynamics are required. Moreover, because of the inherent characteristics of such a method, the material against which a pressure is to be measured must have a smooth surface. (A strain gauge is described, for example, in J. Yarnell, *Strain Gauge*, London (1951).)

Methods using pressure-sensitive paints (strain-sensitive lacquers) have the defect that a coating unevenness tends to occur, difficulty in adhesion between the paint and the material against which a pressure is to be measured is observed, and the operation is complicated.

Methods using a load meter are unsuitable for measuring planar and linear pressures because the measuring device cannot be made small in size.

A method for measurement of pressure using a pressure-sensitive laminate is also known (e.g., as described in U.S. Pat. No. 3,647,504). This method involves the use of a one-sheet type recording sheet coated with microcapsules of different wall thicknesses which contain marking solutions of different colors. Different microcapsules are ruptured corresponding to different pressures, and therefore, the colors from the ruptured microcapsules are different. The magnitude of the pressures are determined by an examination of the colors formed.

In this method for examining pressures by changes in color, the magnitude of the pressures can be determined qualitatively, but it is difficult to measure pressures accurately. Furthermore, in practical applications, the pressure-sensitive laminate is highly colored, and may soil the hands or wearing apparel.

U.S. Pat. No. 3,469,439, on the other hand, discloses a pressure-measuring system containing a mixture of groups of microcapsules whose ranges of pressure measurement do not overlap each other. This system, however, has a number of defects among which are:

(1) A linear change in density corresponding to the pressure cannot be obtained since the pressure-measuring ranges do not overlap each other.

(2) A measuring sheet capable of covering a given range of pressures cannot be obtained by mixing a variety of groups of microcapsules obtained using conventional encapsulating methods.

(3) As a result of merely mixing a variety of groups of microcapsules having completely different ranges of pressure-measurement, pressures between the pressure measuring ranges of any two groups of microcapsules give rise to the same color density as the saturation color density of the groups of microcapsules which forms a color at a lower pressure, and therefore, pressure cannot be measured.

With the above-described background in mind, a series of investigations have been made on a method for measuring the pressures of various kinds of measuring sites without a device of a large size, highly sophisticated operating techniques and complicated calculations being involved. These investigations led to the discovery that a method which comprises contacting a recording sheet with an object to be measured to form a color under pressure, and reading the pressure of the object from the change in the optical density of the colored image on the recording sheet, the color-formation of the record sheet being effected by the contacting of a color former in a microcapsule layer and a color developer in a color developer layer in the recording sheet under pressure.

When pressure-sensitive recording sheets or pressure-sensitive copying sheets (e.g., as disclosed in U.S. Pat. Nos. 2,712,507, 2,730,456, 2,730,457, 3,418,250 and 3,425,327) are used, the accuracy of pressure measurement within a pressure range of about 50 kg/cm$^2$ to about 1,000 kg/cm$^2$ is poor. Investigations were continued in order to eliminate this defect, and a pressure-measuring sheet having a superior accuracy for measuring pressures of about 50 kg/cm$^2$ to about 1,000 kg/cm$^2$ was discovered. This discovery led to the accomplishment of the present invention.

SUMMARY OF THE INVENTION

A first object of this invention is to provide a pressure measuring sheet which can be used to measure pressures, such as planar pressures or linear pressures, of materials without a large-scale apparatus, highly sophisticated operating techniques and complicated calculations being required.

A second object of this invention is to provide a method for measuring pressures such as planar and linear pressures by a simple dynamic measurement utilizing a pressure measuring sheet.

A third object of this invention is to provide a pressure measuring sheet which provides measured values with high accuracy in measuring pressures such as planar or linear pressures within a range of about 50 kg/cm$^2$ to about 1,000 kg/cm$^2$.

A fourth object of this invention is to provide a pressure measuring sheet which is not limited to the measurement of pressures at points, but which can be easily used to measure the distribution of pressures such as planar or linear pressures.

A fifth object of the invention is to provide a pressure measuring sheet which permits the pattern of the pressure distribution measured to be stored over long periods of time.

A sixth object of the invention is to provide a pressure measuring sheet which does not soil the hands or wearing apparel and undergoes little undesired coloration.

The above objects of the invention are achieved by (I) a pressure-measuring sheet comprising a support having thereon a layer of a mixture of at least two groups of microcapsules with each of the groups of microcapsules containing an electron-donating color former capable of forming a color on contact with an electron-accepting color developer, in which the mixture comprises (1) a first group of microcapsules having a $\delta/D$ ratio of about $5 \times 10^{-3}$ to about $5 \times 10^{-2}$, wherein $\delta$ is the number average microcapsule wall thickness of the microcapsules and D is the volume average particle size of the microcapsules and (2) a second group of microcapsules having a $\delta/D$ ratio of about $1 \times 10^{-2}$ to about $1 \times 10^{-1}$, and with the Ps value difference between the first group of microcapsules and the second group of microcapsules being about 50 to about 1,000 kg/cm$^2$ where Ps is the lowest pressure at which no further color density is formed by the color former with a color developer, and (3) optionally one or more additional groups of microcapsules having a $\delta/D$ ratio of about $5 \times 10^{-3}$ to about $1 \times 10^{-1}$, having a Ps value difference from the first group and the second group of microcapsules in accordance with the following relationship, 50 kg/cm$^2$ $\leq \Delta Ps \leq$ 300 kg/cm$^2$ and being present in an amount of 40 volume% or less based on the total volume of all microcapsules; and (II) a method for measuring pressure, which comprises contacting the pressure measuring sheet described above with a site of an object where the pressure is to be measured to generate a color under pressure, and reading the pressure from the change in the optical density or the color hue of the colored image on the sheet, the color formation of the sheet being effected by the contact of a color former in a microcapsule layer and a color developer in a color developer layer under pressure.

DETAILED DESCRIPTION OF THE INVENTION

The term Ps value, as used in the invention, is the color density-saturated pressure value which denotes the lowest pressure at which the density of the color formed by the color former on contact with a color developer no longer increases.

The microcapsule mixture used in this invention comprises a mixture of at least two groups of microcapsules. In a basic embodiment of the invention, the mixture comprises a first group of microcapsules having a $\delta/D$ ratio of about $5 \times 10^{-3}$ to about $5 \times 10^{-2}$ and a second group of microcapsules having a $\delta/D$ ratio of about $1 \times 10^{-2}$ to about $1 \times 10^{-1}$. Preferably, the capsule mixture comprises a first group of microcapsules having a $\delta/D$ ratio of $1 \times 10^{-2}$ to $3 \times 10^{-2}$ and a second group of microcapsules having a $\delta/D$ ratio of $3 \times 10^{-2}$ to $9 \times 10^{-2}$.

The Ps value difference between the two groups of microcapsules described above is about 50 kg/cm$^2$ to about 1,000 kg/cm$^2$, preferably 200 to 800 kg/cm$^2$.

The mixing ratio of these two groups of microcapsules may be selected depending on the $\delta/D$ ratio and the Ps values of the capsule groups and the desired range of pressures to be measured. Generally, as the proportion of the group of microcapsules having a lower $\delta/D$ ratio increases, the range of pressures which can be measured changes toward the lower pressure side. Within the measuring range of about 50 kg/cm$^2$ to about 1,000 kg/cm$^2$, a mixture of the first group of microcapsules having a $\delta/D$ ratio of about $1 \times 10^{-2}$ to about $3 \times 10^{-2}$ and the second group of microcapsules having a $\delta/D$ ratio of $3 \times 10^{-2}$ to $9 \times 10^{-2}$ in a weight ratio of about 1:50 to about 50:1 is preferred, more preferably 1:20 to 20:1.

As described above, optionally one or more additional groups of microcapsules can be present in the mixture of microcapsules in addition to the first group and the second group of microcapsules having the characteristics described above. Where additional groups of microcapsules are present, such should have a $\delta/D$ of from about $5 \times 10^{-3}$ to about $1 \times 10^{-1}$ with the Ps value difference, $\Delta Ps$, between the additional groups of microcapsules and the first and second groups of microcapsules being defined by the relationship $$50 \text{ kg/cm}^2 \leq \Delta Ps \leq 300 \text{ kg/cm}^2$$

A suitable amount of these additional groups of microcapsules can be about 40 volume% or less based on the total volume of all of the microcapsules.

The pressure-measuring sheet of this invention is obtained by forming a layer of microcapsules containing a color former and a layer of a color developer on the same surface or opposite surfaces of a support, or on different supports.

Microencapsulation used to produce the microcapsules employed in this invention can be achieved by various known methods, for example, a coacervation method (as disclosed, for example, in U.S. Pat. Nos. 2,800,457, 2,800,458, 3,041,289 and 3,687,865), an interfacial polymerization method (as disclosed, for example, in U.S. Pat. Nos. 3,492,380 and 3,577,515, and British Pat. Nos. 950,433, 1,046,469 and 1,901,141), an internal polymerization method (as disclosed, for example, in British Pat. No. 1,237,498 and French Pat. Nos. 2,060,818 and 2,090,862), and an external polymerization method (as disclosed, for example, in British Pat. No. 989,264, and Japanese Pat. Publication Nos. 12380/62, 14327/62, 29483/70, 7313/71 and 30282/71).

Needless to say, various conditions such as the types of additives, the amounts of materials, and the treating conditions need to be controlled in order to obtain the specific $\delta/D$ ratios. More specifically, the microcapsule layer as used in the present invention can be basically prepared by controlling the amount of core material in the microcapsule, the amount of wall-forming compound of the microcapsule, the size of the microcapsule when emulsified and the reaction conditions for the microcapsule wall-forming compound (i.e., temperature, pH, concentration, stirring condition, etc.). In preparing a monosheet with the microcapsules and the color developer on the same surface of the support, use of polymer microcapsules prepared by the interfacial polymerization method, the internal polymerization method and the external polymerization method is preferred.

There are no restrictions on the solvents which can be used to dissolve the color former, and all solvents known in the art can be used. Examples of suitable solvents are aromatic synthetic oils such as alkylated naphthalene, alkylated biphenyl, hydrogenated terphenyl, and alkylated diphenylmethane (with the number of alkyl groups being 1 to about 4; with each alkyl group containing about 1 to 5 carbon atoms); petroleum fractions such as kerosene, naphtha and paraffin oils; aliphatic synthetic oils such as chlorinated paraffin; vegetable oils such as cotton seed oil, soybean oil or linseed oil; and mixtures of these oils. The concentration of the color former in the color former solution is not particularly limited but, in general, ranges from about 1 to about 20% by weight.

The color former used in this invention is a substantially colorless electron-donating organic compound which forms a color upon contact with an electron-accepting solid acid, and can be defined as a substantially colorless electrondonating organic compound.

The type, properties, etc., of the color former exert no substantial effect on the present invention. Hence, all kinds of color formers known in this art can be used. Suitable color formers are, for example, triarylmethane-type compounds, diarylmethane-type compounds, xanthene-type compounds, thiazine-type compounds and spiropyran-type compounds.

Specific examples of suitable color formers which can be used include triphenylmethane compounds such as 3,3-bis(p-dimethylaminophenyl)-6-dimethylaminophthalide (i.e., crystal violet lactone), 3,3-bis(p-dimethylaminophenyl)-phthalide, 3-(p-dimethylaminophenyl)-3-(-1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl)-5-dimethylaminophthalide, 3,3-bis(2-phenylindol-3-yl)dimethylaminophthalide and 3-p-dimethylaminophenyl-3-(1-methylpyrrol-2-yl)-6-dimethylaminophthalide; diphenylmethane compounds such as 4,4'-bis-dimethylaminobenzohydrin benzyl ether, N-halophenyl leuco auramines and N-2,4,5-trichlorophenyl leuco auramine; xanthene compounds such as rhodamine-B-anilinolactam, rhodamine-(p-nitroanilino)lactam, rhodamine-B-(p-chloroanilino)lactam, 3-dimethylamino-7-methoxyfluorane, 3-diethylamino-7-methoxyfluorane, 3-diethylamino-6-chloro-6-methylfluorane, 3-diethylamino-7-(acetylmethylamino)fluorane, 3-diethylamino-7-(dibenzylamino)fluorane, 3-diethylamino-7-(methylbenzylamino)fluorane, 3-diethylamino-7-(chloroethylmethylamino)fluorane and 3-diethylamino-7-(dichloroethylamino)-fluorane; thiazine compounds such as benzoyl leuco methylene blue and p-nitrobenzyl lecuo methylene blue; and spiro compounds such as 3-methyl-spiro-dinaphthopyran, 3-ethyl-spiro-dinaphthopyran, 3,3'-dichloro-spiro-dinaphthopyran, 3-benzyl-spiro-dinaphthopyran, 3-methyl-naphtho-(3-methoxybenzo)-spiropyran and 3-propyl-spiro-dibenzodipyran. These color forming compounds can be used either individually or as admixtures of two or more thereof.

The color formers used in the groups of microcapsules which are mixed and used in this invention are preferably a combination of color formers which will yield the same color. It is especially preferred for these color formers to be the same.

The microcapsules have a size of usually about 0.1 to about 100 microns, preferably about 0.5 to 50 microns, most preferably 1 to 5 microns.

The microcapsule coating composition so obtained is usually a microcapsule dispersion, and therefore, can be coated directly on support. Alternatively, the microcapsule dispersion may, with or without separation of the microcapsules therefrom, be mixed with a binder to form a coating composition. Examples of suitable binders are latexes such as a styrene/butadiene latex, and water-soluble polymeric materials such as starch, carboxymethyl cellulose, polyvinyl alcohol, gum arabic, casein, and gelatin.

The amount of the microcapsules coated is about 0.5 to about 25 g/m$^2$, conveniently 5 to 15 g/m$^2$.

The microcapsule layer is coated on at least one surface of a support, or on or beneath a layer of a color developer described hereinafter. The microcapsules may also be mixed with a color developer and the mixture, then coated on a support. Alternatively, the microcapsule layer may be coated on that surface of a support which is opposite the surface coated with a layer of the color developer.

Suitable supports which can be used in this invention include, for example, synthetic resin films, metal foils, papers, resin-coated papers and synthetic paper-like sheets. A suitable thickness for the support usually is a thickness of about 10 to about 350 microns.

When a resin-coated paper is used as a support, it preferably has regular projections and depressions on the surface.

These projections and depressions in their top plane view generally have shapes such as polygons (e.g., triangles, tetragons, pentagons, hexagons, heptagons or octagons), diamonds, stars, stripes, parallelograms, ellipses of circles. Of these, triangular, tetragonal, hexagonal and circular shapes are conveniently used. In cross-section, suitable shapes are, for example, triangular, tetragonal, pentagonal, trapezoidal, semicircular or semielliptical. In these shapes, the straight lines may be partly replaced by curved lines, or vice versa. Of these cross-sectional shapes, triangular, tetragonal, trapezoidal and semicircular shapes can be especially conveniently used. These shapes, either individually or in combination, may be distributed regularly on the resin-coated paper support.

These depressions or projections have a size of preferably about 10 to about 250 mesh from the standpoint of the accuracy of measurement required. An especially preferred size is 30 to 80 mesh. The effective depth or height, respectively, of these depressions and projections is about 1 to about 200 microns, preferably 10 to 100 microns. Roughly, a preferred ratio of the area of the projections to that of the depressions is about 1:20 to about 20:1.

The surface of such a support may be patterned using embossing techniques. One example is a plate embossing method which comprises pressing a metal plate having engraved thereon a pattern opposite that of the desired shape against the surface of a support. When the support is a thermoplastic polymeric sheet, the metal plate may be heated to an appropriate temperature. Another example is a roller embossing method in which the pattern is formed by interposing a support between a metal roll having engraved therein a pattern opposite that of the desired shape and a roll covered with a hard rubber or cotton, and pressing the rolls against the support while rotating the rolls. When the support is a thermoplastic polymer sheet, the metal rolls may be heated to an appropriate temperature. Still another example is a melt-extrusion embossing method which comprises melt-extruding a thermoplastic polymer such as polyethylene or polypropylene into the form of a sheet, and pressing the melt-extruded sheet while the resin is still deformable using a nip roll against a cooling roll having an engraved pattern opposite that of the desired shape. It is also possible to use a dissolving method which comprises dispersing solid particles in a resin, extruding the mixture into a sheet, and then removing the solid particles by dissolving the solid particles out thereby to form projections and depressions on the surface of the sheet.

When the support is a hydrophobic support, it may be surface-treated prior to coating. The surface treatment of the hydrophobic support can be performed using the following two methods:

(1) A method which comprises activating the surface of the support using a chemical treatment, a mechanical treatment, a corona discharge treatment, a flame treatment, an ultraviolet light irradiation treatment, a high frequency treatment, a glow discharge treatment, an active plasma treatment, a laser treatment, a mixed acid treatment, an ozone oxidation treatment, etc., and then coating the microcapsules directly on the treated surface to obtain increased bond strength;

(2) A method which comprises performing the surface treatment described in (1) above, then forming a subbing layer thereon, and coating microcapsules on the subbing layer; e.g., as disclosed, for example, in U.S. Pat. Nos. 2,698,241, 2,764,520, 2,864,755, 3,462,335 and 3,475,193, and British Pat. Nos. 788,365, 804,005 and 891,469.

Method (2) described above is more effective and is widely practiced. These treatments are considered to more or less form polar groups on the inherently hydrophobic surface of the support, to remove a thin layer which becomes a detrimental factor in adhesion to the polar surface, and to increase the cross-linking density at the surface to increase the bond strength, thereby increasing the adhesion strength of the surface of the support. As a result, the affinity of the surface with the polar groups of components in the subbing composition increases, or the toughness of the surface increases. Application of the subbing composition can be performed by method of forming a double layer which comprises providing a first layer which adheres well to the support, and then forming a second layer of a hydrophilic resin layer on the first layer, or a method of forming a single layer which comprises applying a single resin layer containing both hydrophobic groups and hydrophilic groups.

If desired, the microcapsule dispersion or microcapsule layer may contain a microcapsule reinforcing agent, such as a fine powder of cellulose (e.g., as disclosed in U.S. Pat. No. 2,711,375), a fine power of a polymer (e.g., as disclosed in U.S. Pat. No. 3,625,736), a fine powder of starch (e.g., as disclosed in British Pat. No. 1,232,347), or microcapsules not containing a color former (e.g., as disclosed in British Pat. No. 1,235,991). Desirably, the microcapsule reinforcing agent is not present in the form of a layer, but rather is scattered in the microcapsule layer or at the surface thereof. A suitable diameter for the microcapsule reinforcing agent can range from about 1 to about 2 times that of the microcapsules.

As used herein, the term color developer denotes a solid acid, more specifically, an electron-accepting solid acid. Color developers are described in detail in the patents cited above. Specific examples of suitable color developers which can be used include clays (such as acid terra alba, active terra alba or attapulgite), organic acids (such as aromatic carboxyl compounds (e.g., salicylic acid), aromatic hydroxy compounds (e.g., p-t-butylphenol, p-t-amylphenol, o-chlorophenol, m-chlorophenol or p-chlorophenol), metal salts of these aromatic hydroxy compounds (such as the zinc salt thereof)), mixtures of organic acids and metal compounds such as zinc oxide, and acid polymers (such as a phenol/formaldehyde resins and phenol/acetylene resins). Color developers are also described in detail in U.S. Pat. Nos. 3,501,331, 3,669,711, 3,427,180, 3,455,721, 3,516,845, 3,634,121, 3,672,935 and 3,732,120 and Japanese Patent Publication Nos. 48545/70, 49339/70, 93245/70, 92246/70, 93247/70, 94874/70, 109872/70, 112038/70, 112039/70, 112040/70, 112753/70, 112754/70, 118978/70, 118979/70 and 86950/71.

The color developer may be coated on a support together with a binder. A suitable coating amount of the color developer is about 0.1 to about 40 g/m$^2$. When organic acids and derivatives thereof are used as the color developer, a preferred coating amount thereof is about 0.3 to about 5 g/m$^2$ and, when clays are used as the color developer, a preferred amount thereof is about 2 to about 20 g/m$^2$.

Examples of suitable binders which can be used include latexes such as a styrene/butadiene latex or a styrene/butadiene/acrylonitrile latex; water-soluble natural polymeric compounds such as proteins (e.g., gelatin, gum arabic, albumin or casein), cellulose derivatives (e.g., carboxymethyl cellulose or hydroxyethyl cellulose) and saccharides such as agar-agar, sodium alginate, starches or carboxymethyl starch; water-soluble synthetic polymeric compounds such as polyvinyl alcohol, polyvinyl pyrrolidone, polyacrylic acid or polyacrylamide; and polymeric compounds soluble in organic solvents such as nitrocellulose, ethyl cellulose, polyesters, polyvinyl acetate, polyvinylidene chloride or a vinyl chloride/vinylidene chloride copolymer. These binders can also be used as binders for the microcapsule dispersion. The color developer layer may be contain conventional additives.

Various water-soluble additives can be used as coating aids in coating the microcapsule dispersion and the color developer. Examples of water-soluble additives include, for example, anionic surface active agents, cationic surface active agents, nonionic surface active agents, and natural and synthetic water-soluble thickneners.

When the surface of any support used is hydrophobic, it can be treated by the surface treatment methods described hereinabove.

When the microcapsule layer and the color developer layer are coated on the same surface of a support as a recording layer, a protective layer may be provided by melt-extrusion onto the recording layer so as to protect the recording layer from the ambient atmosphere.

The protective layer can be formed by a melt-extruding method. As is well known in the synthetic resin art, the melt-extruding method denotes a method which comprises coating a molten resin on the recording layer to form a film thereon. Examples of suitable resins which can be used to form a protective layer include polyolefins such as polyethylene or polypropylene, ethylene copolymers such as an ethylene/vinyl acetate copolymer or an ethylene/acrylic acid copolymer, propylene copolymers, polyvinyl chloride, polyamides, polycarbonates, ionomers, mixtures of these resins and multilayer structural mixtures of these polymers. Of these, polyolefins such as polyethylene are especially preferred. The properties (for example, molecular weight) of the resins are not particularly limited when used in the present invention, but they should have the ability to be melt-extruded. The extruding temperature is above the melting point of the resin, preferably within a temperature range at which the viscosity of the molten resin is stable. Such a temperature range is well known in the field of synthetic resins, and, for example, the extrusion temperature for polyethylene is about 250 to about 320° C.

A preferred thickness for the protective layer is about 5 to about 300 microns. A suitable speed of coating the protective layer is about 10 to about 400 m/min., especially about 200 m/min. At this coating speed, a smooth coated surface can be obtained.

The characteristics required of the pressure-measuring sheet in this invention are firstly that there is a correlation (e.g., proportionality or inverse proportionality) between the pressure applied and the optical density of the colored image formed by contact under pressure within the range of measuring pressures, and secondly that the error of measurement should be small, and the measuring accuracy should be high in this correlation.

As a result of a series of investigations, it was discovered that when a mixture of a first group of microcapsules having a $\delta/D$ ratio of about $5 \times 10^{-3}$ to about $5 \times 10^{-2}$ and a second group of microcapsules having a $\delta/D$ ratio of about $1 \times 10^{-2}$ to about $1 \times 10^{-1}$ is used in measuring pressures such as planar or linear pressures within a broad range of about 50 kg/cm$^2$ to about 1,000 kg/cm$^2$, the pressure-measuring sheet obtained exhibits a small measuring error and a very high measuring accuracy.

In operation, the pressure-measuring sheet is first placed at a site of an object against which pressure is to be measured, and a pressure is exerted on the sheet. A color is generated on the sheet according to the magnitude of the pressure applied. Then, the change in the optical density of the color formed is read, and the pressure applied is determined. The pressure applied may be determined instrumentally using, e.g., a densitometer, or using a separately prepared table or calibration sheet or graph which shows the relationship between the density of the color formed and the pressure applied.

The pressure measuring method of this invention is much simpler than methods of measuring planar or linear pressures using a strain gauge, a load meter, a pressure-sensitive paint, etc., and does not require the use of a large-scaled sophisticated apparatus involving an amplifier, a detector, a recorder, etc. In addition, a high level of operating technique or complicated calculations involving material dynamics are not required in this invention. Furthermore, the method is scarcely affected by the surface smoothness of the material against which the pressure is to be measured. Accordingly, the measurement of pressure can be made for a broad range of different types of materials.

While most other conventional methods are directed to the measurement of pressures at points, the method of this invention permits the measurement of the broad distribution of planar and linear pressures. The pattern of the pressure distribution measured can be stored easily for long periods of time on the recorded sheets.

Another advantage of this invention is that the pressure-measuring sheet of this invention does not soil the hands or wearing apparel unlike conventional pressure-sensistive laminates, and the disadvantage of undesired heavy coloration does not occur.

Moreover, while the method disclosed in U.S. Pat. No. 3,469,439 can be used to measure pressures within a very narrow range of 0.07 kg/cm$^2$ to 0.7 kg/cm$^2$, the method of pressure measurement in accordance with this invention using the specific measuring-sheet permits the determination of a broad range of pressures of about 50 kg/cm$^2$ to about 1,000 kg/cm$^2$ with high accuracy and little error.

In the present application, the volume average particle diameter (D) of the microcapsules and the number average wall thickness ($\delta$) of the microcapsule were measured using the following methods.

A. Method of measuring the volume average particle diameter (D) of the microcapsules A microcapsule dispersion was added to about 100 ml of a 1% aqueous solution of sodium chloride so that the concentration of the microcapsule solution was 10 to 100 ppm. The mixture was stirred. The particle diameters of the microcapsules were measured using a universal particle size distribution measurement device (Coulter Counter Model TA, a product of Coulter Electronics Inc., Hialeah, Florida, U.S.A.), and the volume average particle diameter (D in microns) was calculated.

B. Method of measuring the number average wall thickness ($\delta$) of the microcapsules A microcapsule dispersion was coated on a polyethylene terephthalate film base whose surface had been surface-treated. The coating was fixed with an epoxy resin, and allowed to solidify for one day at 60° C. An ultrathin piece was prepared by cutting the resulting structure with a supermicrotome (Porter Blum MT-I, a product of Sorvall, Inc.) so that a microscapsule was cut in half. The ultrathin piece was photographed on a film (Fuji FG Film for electron microscopy, a product of Fuji Photo Film Co., Ltd.) by using a transmission-type electron microscope (HU-12A, a product of Hitachi Limited) at a magnification of about 10,000 to 50,000 × and an acceleration voltage of 100 kv. The microcapsule wall thicknesses were measured from the photograph, and by averaging, the number average wall thickness ($\delta$ in microns) was obtained.

The following Examples are given to illustrate in more detail the useful and practical advantages of the pressure-measuring sheet and the pressure measuring method of this invention. However, the invention is by no means to be construed as being limited to these Examples. Unless otherwise indicated herein, all parts, percentages, ratios and the like are by weight.

EXAMPLE 1

1. Microcapsule Dispersion (1) 1 part of 3,6-bisdiethylaminofluorane-p-nitroanilinolactam and 1.4 parts of 1,3-dimethyl-6-diethylaminofluorane were dissolved in 22 parts of diisopropylnaphthalene. 3 parts of an adduct of 3 moles of tolylene diisocyanate with 1 mole of trimethylolpropane and 0.1 part of an adduct of 1 mole of ethylenediamine with 4 moles of propylene oxide were added and dissolved in the resulting solution. The resulting solution was emulsified and dispersed at 20° C. in a solution of 2.6 parts of polyvinyl alcohol in 29 parts of water.

After the emulsification, 65 parts of water was added, and with stirring, the mixture was heated to 70° C. After stirring the mixture for 1 hour, the mixture was cooled.

The above procedure provided a coating dispersion containing microcapsules having a $\delta/D$ ratio of $1.9 \times 10^{-2}$.

(2) 1 part of 3,6-bisdiethylaminofluorane-p-nitroanilinolactam and 1.4 parts of 1.3-dimethyl-6-diethylaminofluorane were dissolved in 22 parts of diisopropylnaphthalene, and 8.7 parts of an adduct of 3 moles of tolylene diisocyanate with 1 mole of trimethylol propane and 0.1 part of an adduct of 1 mole of ethylenediamine with 4 moles of propylene oxide were dissolved in the resulting solution. The resulting solution was emulsified and dispersed at 20° C. in a solution of 2.6 parts of polyvinyl alcohol in 29 parts of water.

After the emulsification, 89 parts of water was added, and, with stirring, the mixture was heated to 70° C. The mixture was stirred for 1 hour, and then cooled.

The above procedure provided a coating dispersion containing microcapsules having a $\delta/D$ ratio of $4.4 \times 10^{-2}$.

2. Color Former Sheet 1 part of the microcapsule dispersion obtained in (1) above was mixed with 9 parts of the microcapsule dispersion obtained in (2) above. The mixture was coated on a synthetic resin film support (a polyethylene terephthalate film subjected to a corona discharge treatment) at a rate of 7 g/m², and dried to form a color former sheet.

3. Pressure-Measuring Sheet

Sulfuric acid-treated acid terra alba (100 parts), 20 parts of nitrocellulose and 350 parts of ethyl acetate were kneaded in a ball mill for 24 hours to produce a coating solution of a color developer. The coating solution was applied to the surface of the color former sheet obtained in 2. above at a rate of 15 g/m², and dried to form a single-sheet Pressure-Measuring Sheet (A).

(a) Pressures varying at intervals of 100 kg/cm² were applied to the resulting Pressure-Measuring Sheet (A) to form colors. The densities of the colors were measured using a densitometer (Fuji Densitometer Model P-2, produced by the Fuji Photo Film Co., Ltd.), and a calibration curve showing the relationship between the pressures and the densities of the colors was prepared. The relationship of the pressures and the color densities is shown below.

| Pressure (kg/cm²) | Color Density |
|---|---|
| 0 | 0.06 |
| 100 | 0.14 |
| 200 | 0.24 |
| 300 | 0.34 |
| 400 | 0.43 |
| 500 | 0.52 |
| 600 | 0.61 |
| 700 | 0.71 |
| 800 | 0.80 |
| 900 | 0.91 |
| 1,000 | 0.99 |
| 1,100 | 1.00 |

The above table shows that within a pressure range of about 50 to about 1,000 kg/cm², a good linear relationship exists between the pressures and the densities of the colors formed.

(b) The coating dispersion of microcapsules having a $\delta/D$ ratio of $1.9 \times 10^{-2}$ obtained in 1. (1) above was similarly coated on a synthetic resin film base at a rate of 7 g/m², and then the color developer coating solution produced in 2, above was coated on top of the color former layer at a rate of 15 g/m² to form a Pressure-Measuring Sheet (B).

Pressures varying at intervals of 100 kg/cm² were applied to the resulting Pressure-Measuring Sheet (B) to form colors, and the densities of the colors formed were measured using a densitometer. A calibration curve of the pressures versus the color densities was prepared. The relationship between the pressures and the color densities is shown below.

| Pressure (kg/cm²) | Color Density |
|---|---|
| 0 | 0.06 |
| 100 | 0.35 |
| 200 | 0.67 |
| 300 | 0.95 |
| 400 | 0.95 |

This table shows that within a pressure range of 0 to 300 kg/cm², a linear relationship exists between the pressures and the densities of the colors, and the density does not increase at pressures above 300 kg/cm². Hence, the Ps value at this time is about 300 kg/cm².

(c) Separately, the coating dispersion of microcapsules obtained in 1. (2) above which had a $\delta/D$ ratio of $4.4 \times 10^{-2}$ was similarly coated on a synthetic resin film support at 7 g/m², and then the color developer coating solution produced in 2. above was applied on top of the color former layer at a rate of 15 g/m² to form Pressure-Measuring Sheet (C).

Pressures varying at intervals of 100 kg/cm² were applied to Pressure-Measuring Sheet (C) to form colors, and the densities of the colors were measured using a densitometer. A calibration curve showing the relationship between the pressures and the densities was prepared. The relationship of the pressures applied and the densities of the colors formed is shown below.

| Pressure (kg/cm²) | Color Density |
|---|---|
| 0 | 0.06 |
| 100 | 0.06 |
| 200 | 0.07 |
| 300 | 0.15 |
| 400 | 0.26 |
| 500 | 0.37 |
| 600 | 0.49 |
| 700 | 0.60 |
| 800 | 0.70 |

-continued

| Pressure (kg/cm$^2$) | Color Density |
| --- | --- |
| 900 | 0.81 |
| 1,000 | 0.91 |
| 1,100 | 1.00 |
| 1,200 | 1.07 |
| 1,300 | 1.06 |

The table shows that only within a pressure range of 250 to 1,100 kg/cm$^2$ did the pressures and the colors formed have a linear relationship; colors do not form at pressures of 200 kg/cm$^2$ or below; and the density of the color formed does not increase at pressures of 1,200 kg/cm$^2$ or higher. Hence, the Ps value of the microcapsule coated layer was 1,200 kg/cm$^2$.

The results show that when a coating dispersion containing only one kind of microcapsule is used, a linear relationship between the pressures and the densities of the colors formed is established only within a specific range according to the $\delta/D$ ratio of the microcapsules.

(d) The nip pressure between two calender rolls of a paper machine was measured using Pressure-Measuring Sheet (A) obtained from a mixture of the two kinds of microcapsules described above.

The measuring sheet positioned between the rolls was removed, and the density of the color image formed was measured using a densitometer. The density of the color was compared against the calibration curve and the pressure read.

The result obtained are shown in the following table.

| | | Color Density | Pressure (kg/cm$^2$) |
| --- | --- | --- | --- |
| Calender Roll 1 | | | |
| | Left | 0.58 | 560 |
| | Right | 0.61 | 600 |
| Calender Roll 2 | | | |
| | Left | 0.25 | 210 |
| | Right | 0.25 | 210 |

It was found that the balance of Calender Roll 1 was disordered between the left and the right sides. Hence, this imbalance could be corrected while the measurement of the pressure using the pressure-measuring sheet was performed.

COMPARATIVE EXAMPLE 1

For comparison, a strain gauge (a product of Baldwin Locomotive Works) was set between the calender rolls in the same manner as in Example 1, and the nip pressure between them was measured. Since a large-scaled sophisticated apparatus involving an amplifier, a detector, a recorder, etc., was required and the pressure could be measured only at points, it was impossible to know the distribution of the nip pressure between the calender rolls over a broad area (for example, in the width direction of the roll), unlike the case of using the pressure-measuring sheet of this invention.

COMPARATIVE EXAMPLE 2

For comparison, Pressure-Measuring Sheet (B) and Pressure-Measuring Sheet (C) which contained the two kinds of microcapsules having a $\delta/D$ ratio of 1.9 × 10$^{-2}$ and 4.4 × 10$^{-2}$, respectively, were used. When Pressure-Measuring Sheet (B) was used, the pressure of Calender Roll 1 could not be measured. When Pressure-Measuring Sheet (C) was used, the pressure of Calender Roll 2 could not be measured.

The above results show that the pressure-measuring sheet in accordance with this invention exhibits a small measuring error and a very high accuracy in measuring pressures of 50 kg/cm$^2$ to 1,000 kg/cm$^2$.

EXAMPLE 2

1. Microcapsule Dispersion

The same microcapsule dispersion as described in Example 1 was used.

2. Color Former Sheet 1 part of microcapsule dispersion (1) as described in Example 1 was mixed with 9 parts of microcapsule dispersion (2) as described in Example 1. The resulting mixed microcapsule dispersion was coated at a rate of 7 g/m$^2$ using an air knife on a support obtained by melt-extruding polyethylene onto both surfaces of a base paper having a basis weight of 50 g/m$^2$ to form a coating having a thickness of 20 microns. The microcapsule coating was dried to form a color former sheet. The coated surfaces of the polyethylene-coated paper had regular projections and depressions of a circular shape therein. The coated surfaces were subjected to corona discharge treatment and a subbing layer of a styrene/butadiene latex was applied to the treated surfaces before the application of the microcapsule layers.

3. Pressure-Measuring Sheet

Ethyl cellulose (7 parts) and 3 parts of dibutyl phthalate were uniformly dissolved in a mixture of 20 parts of ethanol and 40 parts of ethyl acetate. The solution was mixed with 8 parts of 2-hydroxy-3-naphthoic acid, 20 parts of zinc oxide and a 20% aqueous solution of sodium hydroxide. These components were completely dispersed in a ball mill to form a coating suspension of a color developer. The resulting color developer coating suspension was coated on the color former sheet at a rate of 8 g/m$^2$.

A polyethylene protective layer having a thickness of 30 microns was formed on the resulting color developer layer by melt-extrusion. A single-sheet pressure-measuring sheet which could be soiled only with difficulty and was resistant to oils and water was thus obtained.

(a) Pressures varying at intervals of 100 Kg/cm$^2$ were applied to the resulting pressure-measuring sheet to form colors. The densities of the colors were measured using a densitometer (Fuji Densitometer Model P-2), and a calibration curve showing the relationship between the pressures applied and the color densities was prepared. The relationship between the pressures and the color densities is shown below.

| Pressure (kg/cm$^2$) | Color Density |
| --- | --- |
| 0 | 0.05 |
| 100 | 0.11 |
| 200 | 0.21 |
| 300 | 0.32 |
| 400 | 0.44 |
| 500 | 0.56 |
| 600 | 0.67 |
| 700 | 0.78 |
| 800 | 0.89 |
| 900 | 0.99 |
| 1,000 | 0.98 |

The table shows that a good linear relationship exists between the pressures and the densities of the colors within a pressure range of 50 to 900 kg/cm².

(b) The same test as in Example 1 was performed on each of the two kinds of microcapsules. It was found that when only one kind of microcapsules was used, a linear relationship was established between the pressures and the color densities only within a specified range according to the δ/D ratio of the microcapsules used.

(c) The nip pressure between two calender rolls of a paper machine was measured in the same manner as described in Example 1 using the pressure-measuring sheet obtained from a mixture of the two kinds of microcapsules. The measuring sheet placed between the rolls were removed, and the density of the colored image formed was measured using a densitometer. The color density was compared with a calibration curve to read the pressure. The results obtained are shown below.

|  |  | Color Density | Pressure (kg/cm²) |
| --- | --- | --- | --- |
| Calender Roll 1 |  |  |  |
|  | Left | 0.66 | 590 |
|  | Right | 0.66 | 590 |
| Calender Roll 2 |  |  |  |
|  | Left | 0.22 | 210 |
|  | Right | 0.22 | 210 |

The results obtained coincided well with those obtained in Example 1. The pressure of Calender Roll 1 was measured after correcting the imbalance between the left and the right sides of the calender roll.

COMPARATIVE EXAMPLE 3

For comparison, a strain gauge (a product of Baldwin Locomotive Works) was set between the calender rolls in the same manner as described in Example 2, and the nip pressure was measured. Since a large-scale sophisticated apparatus involving an amplifier, a detector, a recorder, etc., was required and the pressure could be measured only at points, it was impossible to know the distribution of the nip pressure between the calender rolls over a broad area (for example, in the width direction), unlike the case of using the pressure-measuring sheet of this invention.

EXAMPLE 3

1. Microcapsule Dispersion 1 part of 3,6-bisdiethylaminofluorane-p-nitroanilinolactam and 1.4 parts of 1,3-dimethyl-6-diethylaminofluorane were dissolved in 22 parts of diisopropyl naphthalene, and 10 parts of an adduct of 3 moles of tolylene diisocyanate with 1 mole of trimethylolpropane and 0.1 part of an adduct of 1 mole of ethylenediamine with 4 moles of propylene oxide were dissolved in the resulting solution. The resulting solution was emulsified at 20° C. in a solution of 2.6 parts of polyvinyl alcohol in 29 parts of water.

After the emulsification, 65 parts of water was added, and with stirring, the mixture was heated to 70° C. After stirring the mixture for 1 hour, the mixture was cooled. This procedure produced a coating dispersion containing microcapsules having a δ/D ratio of $6.1 \times 10^{-2}$.

2. Color Former Sheet 1 part of the microcapsule coating dispersion (1) as described in Example 1, 7 parts of the microcapsule coating dispersion (2) as described in Example 1, and 2 parts of the microcapsule dispersion described in 1. above were mixed. The mixed dispersion was coated on a synthetic resin film (a polyethylene terephthalate film subjected to a corona discharge treatment) at a rate of 7 g/m², and dried to form a color former sheet.

3. Pressure-Measuring Sheet

A color developer coating solution as described in Example 1 was coated on the resulting color former sheet at a rate of 15 g/m², and dried to form a single-sheet pressure-measuring sheet.

Pressures at invervals of 100 kg/cm² were applied to the resulting pressure-measuring sheet to form colors, and the densities of the colors were measured using a densitometer (Fuji Densitometer Model P-2). A calibration curve showing the relationship between the pressures and the color densities was prepared. The relationship between the pressures and the color densities is shown below.

| Pressure (kg/cm²) | Color Density |
| --- | --- |
| 0 | 0.06 |
| 100 | 0.12 |
| 200 | 0.23 |
| 300 | 0.33 |
| 400 | 0.41 |
| 500 | 0.50 |
| 600 | 0.59 |
| 700 | 0.69 |
| 800 | 0.77 |
| 900 | 0.88 |
| 1,000 | 0.98 |
| 1,100 | 1.03 |

The table shows that a very good linear relationship exists between the pressures and the densities of the colors formed within a pressure range of 50 to 1,000 kg/cm².

A comparison of this table with the table shown in Example 1 demonstrates that by blending three groups of microcapsules containing a color former, the linear relationship within a pressure range of 900 to 1,100 kg/cm² can be improved.

While the invention has been described in detail and with reference to specific embodiments thereof, it will be apparent to one skilled in the art that various changes and modifications can be made therein without departing from the spirit and scope thereof.

What is claimed is:

1. A pressure-measuring sheet comprising a support having thereon a layer or a mixture of at least a first group and a second group of microcapsules, each of said groups of microcapsules containing electron-donating color former capable of forming a color on and a color developer on said support containing microcapsules or on a separate support wherein (1) said first group of microcapsules has a δ/D ratio of about $5 \times 10^{-3}$ to about $5 \times 10^{-2}$, wherein δ is the number average microcapsules wall thickness of the microcapsules and D is the volume avarage particle size of the micrcapsules and (2) said second group of microcapsules has a δ/D ratio of about $1 \times 10^{-2}$ to about $1 \times 10^{-1}$, and with the Ps value difference between the first group of microcapsules and the second group of microcapsules being about 50 to about 1,000 kg/cm² where Ps is the lowest pressure at which no further color density is formed by the color former with a color developer.

2. The pressure-measuring sheet of claim 1, wherein said first group of microcapsules has a δ/D ratio of $1 \times 10^{-2}$ to $3 \times 10^{-2}$ and said second group of microcapsules has a δ/D ratio of $3 \times 10^{-2}$ to $9 \times 10^{-2}$.

3. The pressure-measuring sheet of claim 2, wherein the Ps value difference is 200 kg/cm² to 800 kg/cm².

4. The pressure-measuring sheet of claim 1, wherein the microcapsules have a particle size of about 0.1 to about 100 microns.

5. The pressure-measuring sheet of claim 4, wherein said microcapsules have a particle size of 0.5 to 50 microns.

6. The pressure-measuring sheet of claim 1, wherein the amount of the microcapsules coated is about 0.5 to about 25 g/m².

7. The pressure-measuring sheet of claim 6, wherein the amount of the microcapsules coated is 5 to 15 g/m².

8. The pressure-measuring sheet of claim 1, wherein said layer of microcapsules additionally comprises a third group of microcapsules having a δ/D ratio of about $5 \times 10^{-3}$ to about $1 \times 10^{-1}$, having a Ps value difference from said first group and second group of microcapsules in accordance with the following relationship, 50 kg/cm² ≦ ΔPs ≦ 300 kg/cm², and being present in an amount of 40 volume % or less based on the total volume of all microcapsules.

9. The pressure-measuring sheet of claim 8, wherein said first group of microcapsules has a δ/D ratio of $1 \times 10^{-2}$ to $3 \times 10^{-2}$ and said second group of microcapsules has a δ/D ratio of $3 \times 10^{-2}$ to $9 \times 10^{-2}$.

10. The pressure-measuring sheet of claim 9, wherein the Ps value difference is 200 kg/cm² to 800 kg/cm².

11. The pressure-measuring sheet of claim 8, wherein the microcapsules have a particle size of about 0.1 to about 100 microns.

12. The pressure-measuring sheet of claim 11, wherein said microcapsules have a particle size of 0.5 to 50 microns.

13. The pressure-measuring sheet of claim 8, wherein the amount of the microcapsules coated is about 0.5 to about 25 g/m².

14. The pressure-measuring sheet of claim 13, wherein the amount of the microcapsules coated is 5 to 15 g/m².

15. The pressure-measuring sheet of claim 8, wherein said electron-accepting color developer is on the same side of the support as the microcapsule layer.

16. The pressure-measuring sheet of claim 15, wherein the amount of said color developer is about 0.1 to about 40 g/m².

17. The pressure-measuring sheet of claim 8, wherein said electron-accepting color developer is on the opposite side of the support as the microcapsule layer.

18. The pressure-measuring sheet of claim 17, wherein the amount of said color developer is about 0.1 to about 40 g/m².

19. The pressure-measuring sheet of claim 8, wherein said color former is dissolved in a solvent.

20. The pressure-measuring sheet of claim 1, wherein said electron-accepting color developer is on the same side of the support as the microcapsule layer.

21. The pressure-measuring sheet of claim 1, wherein the amount of said color developer is about 0.1 to about 40 g/m².

22. The pressure-measuring sheet of claim 1, wherein said electron-accepting color developer is on the opposite side of the support as the microcapsule layer.

23. The pressure-measuring sheet of claim 22, wherein the amount of said color developer is about 0.1 to about 40 g/m².

24. The pressure-measuring sheet of claim 1, wherein said color former is dissolved in a solvent.

* * * * *